United States Patent

Iino et al.

Patent Number: 5,909,895
Date of Patent: Jun. 8, 1999

[54] THERMOPLASTIC RESIN FILM AIR BAG

[75] Inventors: Yasuhiro Iino, Yokohama; Yosuke Matsushima, Sagamihara, both of Japan

[73] Assignee: Bridgestone Corporation, Tokyo, Japan

[21] Appl. No.: 08/872,153

[22] Filed: Jun. 10, 1997

[30] Foreign Application Priority Data

Jun. 11, 1996 [JP] Japan .................................. 8-148848

[51] Int. Cl.⁶ .................................................. B60R 21/16
[52] U.S. Cl. ................................... 280/743.1; 280/728.1
[58] Field of Search ............................. 280/743.1, 728.1, 280/731

[56] References Cited

U.S. PATENT DOCUMENTS

| | | | |
|---|---|---|---|
| 5,114,180 | 5/1992 | Kami et al. | 280/743.1 |
| 5,452,914 | 9/1995 | Hirai | 280/743.1 |
| 5,630,620 | 5/1997 | Hirai et al. | 280/743.1 |

FOREIGN PATENT DOCUMENTS

| | | |
|---|---|---|
| 2-114035 | 4/1990 | Japan . |
| 2-162134 | 6/1990 | Japan . |
| 3-7337 | 1/1991 | Japan . |
| 6-199198 | 7/1994 | Japan . |

*Primary Examiner*—Peter C. English
*Attorney, Agent, or Firm*—Sughrue, Mion, Zinn Macpeak & Seas, PLLC

[57] ABSTRACT

An air bag comprises a facing sheet and a backing sheet of thermoplastic resin film and laminated on at least an outer peripheral joining region thereof with a thermoplastic resin film. An adhesion reinforcing layer(s) is interposed between the facing sheet and the backing sheet at the joining region and made from a thermoplastic resin provided that an insulating layer is interposed in the adhesion reinforcing layer at a region ranging from a position corresponding to an approximately center of the outer peripheral joining region toward the inside thereof. The facing and backing sheets and the adhesion reinforcing layer are heat-welded together at the outer peripheral joining region.

7 Claims, 6 Drawing Sheets

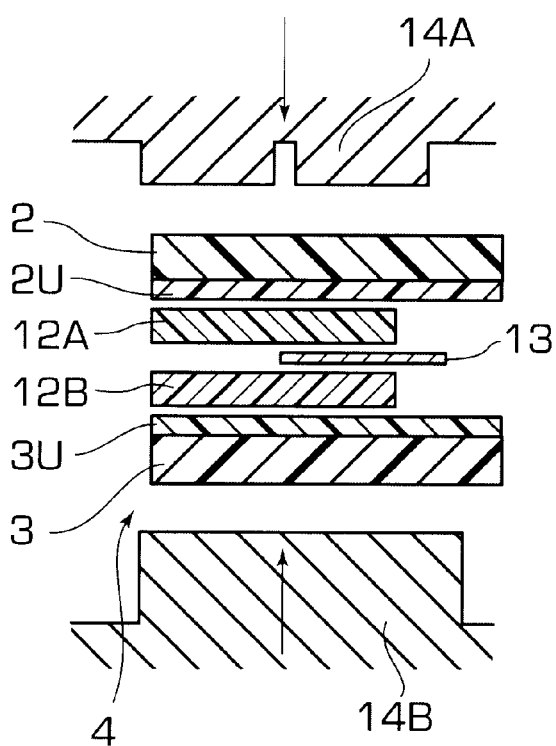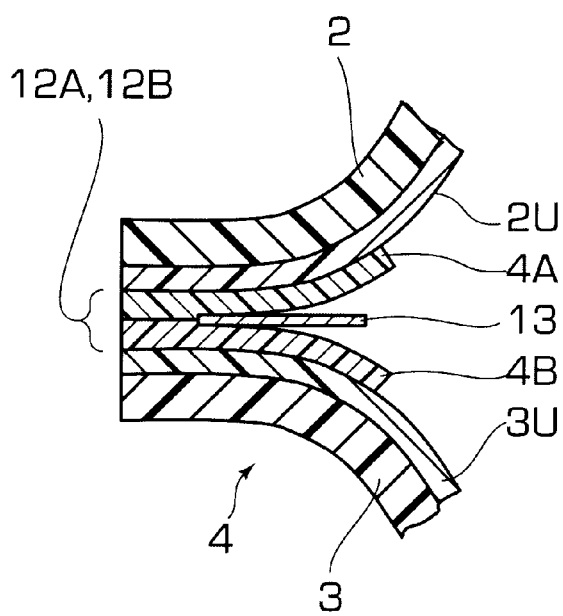

FIG. 6a
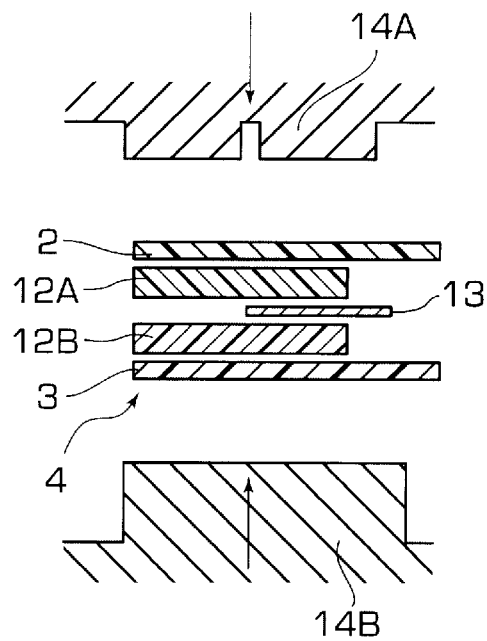
FIG. 6b
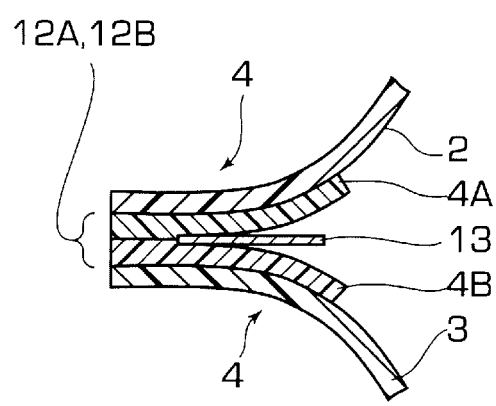
FIG. 7a
PRIOR ART
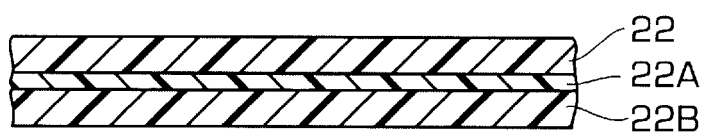
FIG. 7b
PRIOR ART
FIG. 7c
PRIOR ART
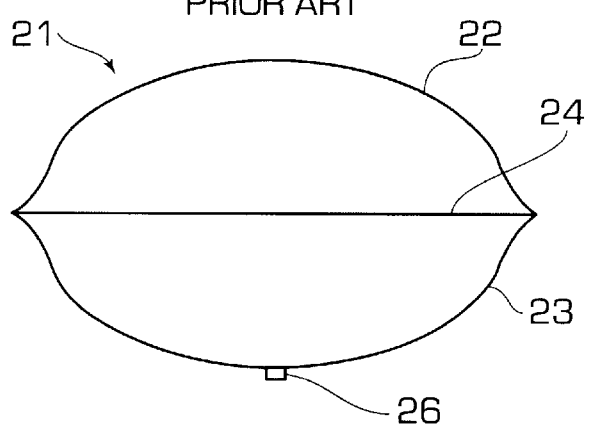
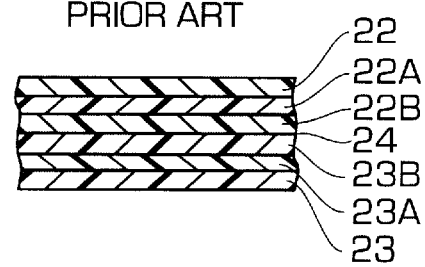

THERMOPLASTIC RESIN FILM AIR BAG

BACKGROUND OF THE INVENTION

1. Field of the Invention

This invention relates to an air bag formed by joining a facing sheet and a backing sheet each made from a thermoplastic film such as urethane or the like and having a light weight and a high mechanical strength.

2. Description of Related Art

In order to stably protect passengers in an automobile during an automobile accident, an air bag is used by attaching to a steering wheel and the like for the automobile. The air bag is usually produced by cutting a base woven cloth for the air bag crosslink-coated with silicone, rubber or the like and sewing it into a bag.

Furthermore, the air bag is provided with an opening for an inflator attached to a base plate facing a gas generator. A second opening for a vent effectively absorbs shock, and portions surrounding these openings are stitched with a reinforcing cloth made from the same material as the air bag. Recently, there have been proposed air bag cloths laminated with various synthetic resin layers in order to attain a weight reduction of the air bag, the improvement of the mechanical strength without substantially causing the aging degradation, and heat-welding such as high frequency welding or the like is carried out for joining these cloths with each other.

For example, JP-A-2-114035, JP-A-2-162134, JP-A-3-7337 and JP-A-6-199198 disclose air bags obtained by joining the air bag cloths through the heat-welding.

Among them, a typical air bag is shown in FIG. 7. As shown in FIG. 7b, the air bag 21 is formed by joining a facing fabric 22 and a backing fabric 23 at a joint part 24. Numeral 26 is a gas inlet port. Each of these fabrics is laminated with a polyester resin layer 22B through a primer coat layer 22A as shown in FIG. 7a. These facing and backing fabrics 22, 23 are heat-welded by facing the polyester resin layer 22B to the polyester resin layer 23B at the joint part 24 as shown in FIG. 7c. As a result of such joining, it is possible that the hardness and the bending property of the joint part 24 and the adhesion strength between the fabric and the resin layer and the welded strength between the resin layers improve.

However, when air bag 21 is inflated, the facing and backing fabrics 22, 23 are separated from each other at the joint part 24 as shown in FIG. 7b and hence a large peeling force is applied between the layers in the joint part 24. Since the welded strength (peel strength) between the polyester resin layers 22B and 23B is fairly high, there is no fear of causing peeling between the polyester resin layers 22B and 23B. On the other hand, the peel strength between the fabric 22 (23) and the primer coat layer 22A (23A) is not so high and hence there is a fear of causing the peeling therebetween.

In order to prevent peeling between the synthetic resin layer and the fabric at the joint part formed by joining air bag cloths, each laminated with the synthetic resin layer to each other through the heat-welding, there was proposed an air bag in JP-A-2-162134. As shown in FIG. 8, an air bag 31 is formed by piling two base cloths 32 and 33 each covered on at least one surface with rubber or a thermoplastic resin one upon the other at their outer peripheral end portions to face these covered surfaces to each other. A reinforcing cloth 34, made from the same covering material as in the base cloth is applied to an inner peripheral face of the piled portion and then heat-welding them.

In such an air bag, the force in the peeling direction between the facing and backing base cloths 32 and 33 is received as a force in the shearing direction among the base cloths 32 and 33 and the reinforcing cloth 34 to enhance the strength at the joint face.

However, the reinforcing cloth 34 is arranged along a face substantially perpendicular to the joint face between the facing and backing base cloths 32 and 33. That is, these cloths should be joined so that the reinforcing cloth 34 is three-dimensionally arranged to the joint face which is two-dimensioned. Therefore, the heat-welding device such as a high-frequency welding device or the like becomes more complicated. Furthermore, the reinforcing cloth 34 is a cylindrical body, so that the production thereof is troublesome. Moreover, if it is intended to two-dimensionally join the reinforcing cloth 34 to the joint face, a problem of leaving wrinkles on the joint face is created.

SUMMARY OF THE INVENTION

It is, therefore, an object of the invention to solve the aforementioned problems of the conventional techniques and to provide an air bag formed by joining air bag facing and backing substrates with each other through a simple joining method to obtain a joint face provided with a thermoplastic resin film such as urethane or the like and having an excellent adhesion property and a high joining strength.

According to the invention, there is the provision of an air bag comprising a facing sheet and a backing sheet each made from a thermoplastic resin film and laminated on at least an outer peripheral joining region thereof with a thermoplastic resin film, and an adhesion reinforcing layer (s) interposed between the facing sheet and the backing sheet at the joining region and made from a thermoplastic resin provided that an insulating layer is interposed in the adhesion reinforcing layer at a region ranging from a position corresponding to an approximately center of the outer peripheral joining region toward the inside thereof, these facing and backing sheets and the adhesion reinforcing layer being heat-welded together at the outer peripheral joining region.

In preferable embodiments of the invention, each of the facing sheet and backing sheet is made from an urethane resin film, and laminated over its full surface with an urethane resin film.

In another preferable embodiment of the invention, the adhesion reinforcing layer is made from an urethane resin film and favorably laminated on both surfaces with a thermoplastic resin film such as urethane resin film or the like.

In the other preferable embodiment of the invention, the adhesion reinforcing layer is a ring of urethane resin having a shape corresponding to the outer peripheral joining region and provided on its inner peripheral face with a notch having a given depth. Alternatively it is formed by joining both free ends of a tape-shaped body having slits formed on its surface at given intervals to each other to have a ring shape corresponding to the outer peripheral joining region.

BRIEF DESCRIPTION OF THE DRAWINGS

The invention will be described with reference to the accompanying drawings, wherein:

FIG. 1b is a partly enlarged section view illustrating a state of forming an outer peripheral joining region of the air bag of FIG. 1a;

FIG. 1c is a partly enlarged section view of the outer peripheral joining region in the air bag of FIG. 1a;

FIG. 2b is a partly enlarged section view of the outer peripheral joining region in the air bag of FIG. 2a;

FIG. 5a is a partly enlarged section view illustrating a state of forming an outer peripheral joining region in a fifth embodiment of the air bag according to the invention;

FIG. 5b is a partly enlarged section view of the outer peripheral joining region in the air bag of FIG. 5a;

FIG. 6a is a partly enlarged section view illustrating a state of forming an outer peripheral joining region in a sixth embodiment of the air bag according to the invention;

FIG. 6b is a partly enlarged section view of the outer peripheral joining region in the air bag of FIG. 6a;

FIG. 7a is a partial section view of a substrate constituting a first embodiment of the conventional air bag;

FIG. 7b is a diagrammatically front view of a first embodiment of the conventional air bag;

FIG. 7c is a section view of an outer peripheral joining region in the conventional air bag of FIG. 7b.

DESCRIPTION OF THE PREFERRED EMBODIMENTS

Figure 1A:
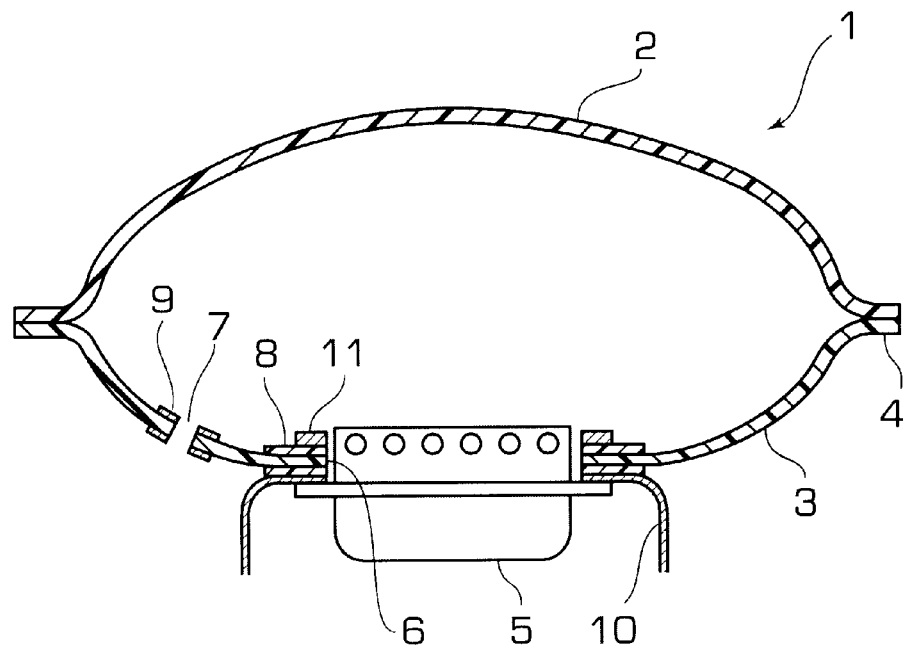
FIG. 1a is a diagrammatically section view of a first embodiment of the air bag according to the invention.

FIG. 1a shows a first embodiment of the air bag according to the invention. This air bag 1 is comprised of a pair of a facing sheet 2 and a backing sheet 3 each made by cutting a film-shaped sheet of urethane nylon or polyester resin or the like into an approximately circular form and joining outer peripheral joining regions thereof with each other through heat-welding to form a bag.

As shown in FIG. 1a, an opening 6 for mounting an inflator 5 is formed in substantially a central zone of the backing sheet 3 in order to feed a high pressure gas into air bag 1 by actuating the inflator 5 based on detection of deceleration speed when any serious accident happens in the vehicle during the running. An opening 7 is used to effectively absorb shock of the air bag 1 to a human body in the inflation is formed in a proper place of the backing sheet 3. Reinforcing sheets 8 and 9 are joined onto surroundings of these openings 6 and 7, respectively. The peripheral edge portion of the opening for the inflator in the backing sheet 3, the reinforcing sheet 8 for the opening 6 and a fitting flange of the inflator 5 are secured through a retainer 11 to a base plate 10 fixed to a steering shaft or the like by means of through bolts and the like (not shown).

Figure 1B:
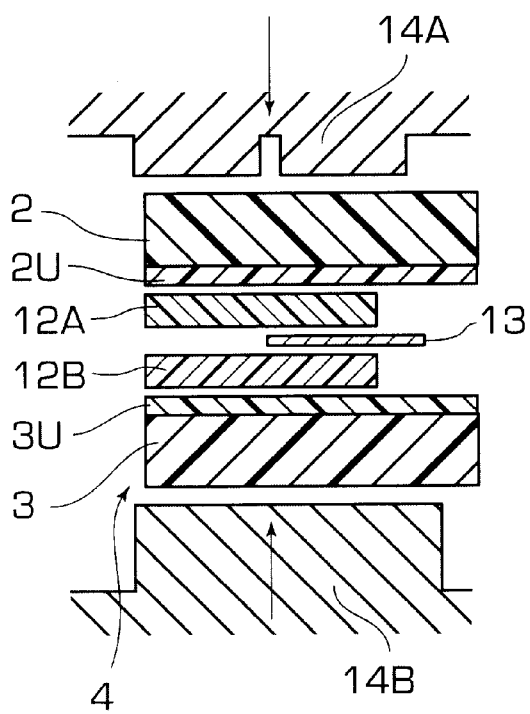
Figure 1C:
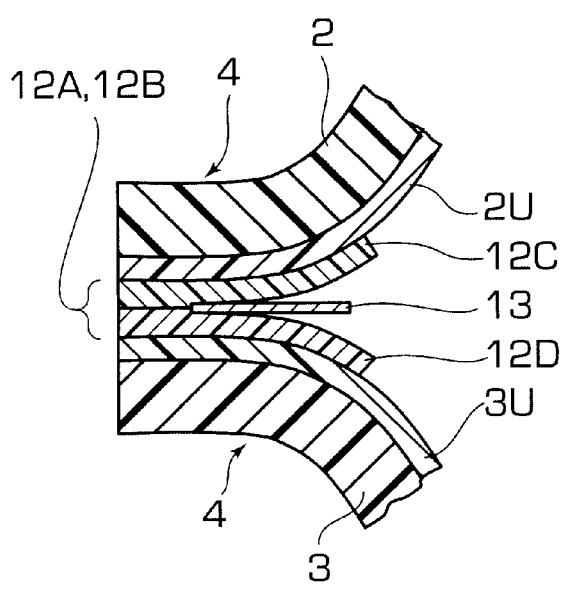

In the formation of the outer peripheral joining region 4 between the facing sheet 2 and the backing sheet 3 as shown in FIG. 1a, the inner surfaces or joining surfaces of the facing sheet 2 and the backing sheet 3 are laminated with thermoplastic resin films 2U and 3U such as urethane film or the like, respectively, as shown in FIG. 1b. Recently, in order to attain a weight reduction of the air bag and the improvement of mechanical strengths while using a material having less change over time, various kinds of synthetic resin layers are generally laminated on a full inner surface of a relatively thin sheet constituting the air bag. Alternatively the synthetic resin layer may be laminated only in the vicinity of the joining region, if acceptable.

When the facing sheet 2, laminated on at least a joining region with the thermoplastic resin film 2U, is joined with the backing sheet 3 laminated on at least a joining region with the thermoplastic resin film 3U, explaining the illustrated embodiment with respect to the outer peripheral joining region 4 of the air bag 1, the facing and backing sheets 2 and 3 are first set between a pair of electrodes 14A and 14B arranged substantially in parallel to each other and at a given interval in up and down directions to face the thermoplastic resin films 2U and 3U to each other. The adhesion reinforcing layers 12A and 12B, each made from a thermoplastic resin film such as urethane or the like as a material having approximately the same adhesion strength as in the thermoplastic resin films 2U and 3U, are interposed between the facing and backing sheets 2 and 3. In this case, an insulating layer 13 as a middle layer obstructing the heat-welding between the adhesion reinforcing layers is interposed between the adhesion reinforcing layers at a region ranging from a position corresponding to an approximately center of the outer peripheral joining region 4 toward the inside thereof to peel off the facing and backing sheets from each other at the insulating layer existing region in the inflation of the air bag 1.

As the insulating layer, use may be made of paper, TEFLON (synthetic resinous flourine) film, olefin resin film and the like.

As shown in FIG. 1b, the facing and backing sheets 2, 3 provided with the thermoplastic resin films 2U and 3U and the adhesion reinforcing layers 12A and 12B are heat-welded, for example, through high frequency welding by approaching the two electrodes 14A and 14B to each other in arrow directions as shown in FIG. 1b by arrows. Thus these members in the outer peripheral joining region 4 can be strongly joined with each other except that portions 12C and 12D of the adhesion reinforcing layers sandwiching the insulating layer 13 therebetween are not heat-welded.

When the air bag 1 provided with the heat-welded outer peripheral joining region 4 is inflated by feeding a high pressure gas from the inflator 5, even if the joint face will be peeled by the facing and backing sheets 2 and 3 separating from each other, peeling is prevented by the strong welded adhesion reinforcing layers 12A and 12B in the joint face, and also the portions 12C and 12D of the adhesion reinforcing layers sandwiching the insulating layer therebetween are strongly heat-welded onto the facing and backing sheets 2 and 3 to assist the prevention of above peeling phenomenon. Hence the separations between the facing sheet 2 and the thermoplastic resin film 2U and between the backing sheet 3 and the thermoplastic resin film 3U converting the peeling direction into the shearing direction are effectively prevented.

Moreover, the facing and backing sheets 2, 3 provided with the thermoplastic resin films 2U and 3U and the adhesion reinforcing layers 12A and 12B and the insulating layer 13 are merely laminated in layer form between the electrodes 14A and 14B arranged in parallel to each other. As a result the outer peripheral portions of these members can easily be joined at once by the welding and hence the structure of the joining device itself becomes simple.

As the material for the facing and backing sheets 2 and 3, nylon film and polyester film can be used instead of the urethane film.

FIG. 2 shows a second embodiment of the air bag according to the invention, which is a modified embodiment of the first embodiment.

Figure 2A:
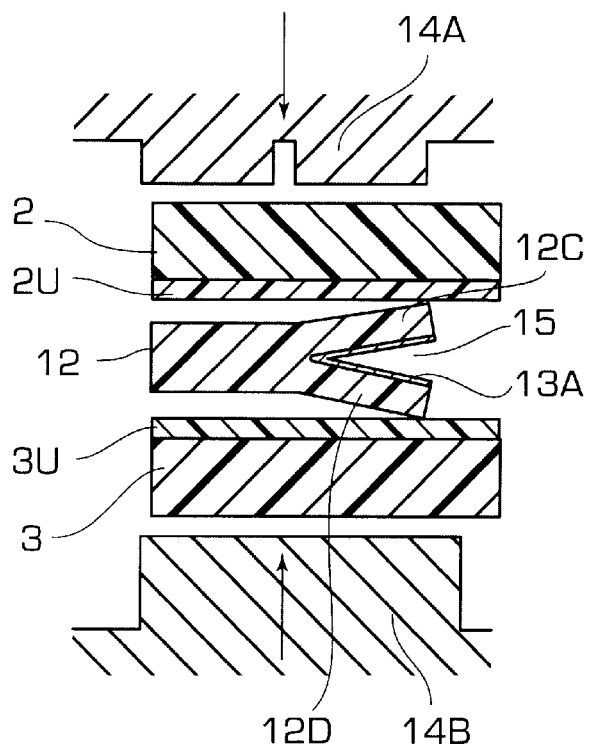
FIG. 2a is a partly enlarged section view illustrating a state of forming an outer peripheral joining region in a second embodiment of the air bag according to the invention.
Figure 2B:
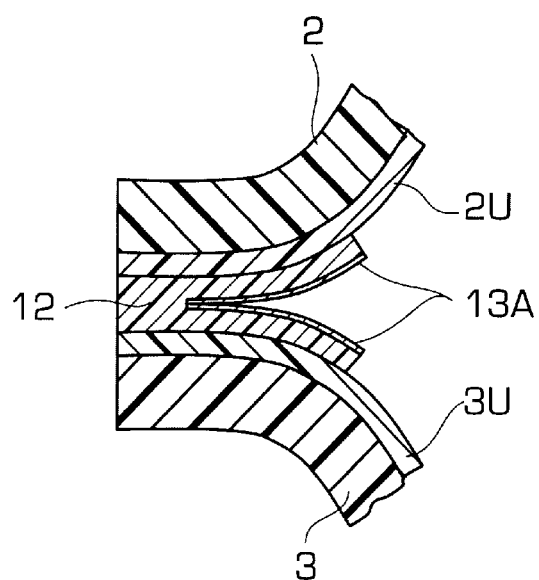

In the first embodiment, two adhesion reinforcing layers 12 are used, while as shown in FIG. 2a, the adhesion reinforcing layer 12 in the second embodiment is a single layer of a thermoplastic resin film such as urethane or the like having substantially a Y-shaped section, which is formed by a notch portion 15 to form separate portions 12C and 12D together with the facing and backing sheets 2 and 3 separated and peeled during the inflation of the air bag 1 as shown in FIG. 2b (showing the outer peripheral joining region). An insulating layer 13A made from an olefin resin or the like is previously formed between the separate portions 12C and 12D by co-extrusion molding with the adhesion reinforcing layer 12 or the like.

In the second embodiment, the adhesion reinforcing layer 12 may be continuously formed by co-extruding the insulating layer 13A with the thermoplastic resin to have a Y-shaped section in the adhesion reinforcing layer 12, or an insulating layer 13A made from paper, TEFLON (Synthetic Resinous Flourine), olefin resin or the like may be laminated on the inner faces of the Y-shaped section in the previously formed thermoplastic resin film as the adhesion reinforcing layer 12.

In this way, the operation of sandwiching the insulating layer may be omitted in the high frequency welding operation and hence the operation efficiency is more improved.

Figure 3:
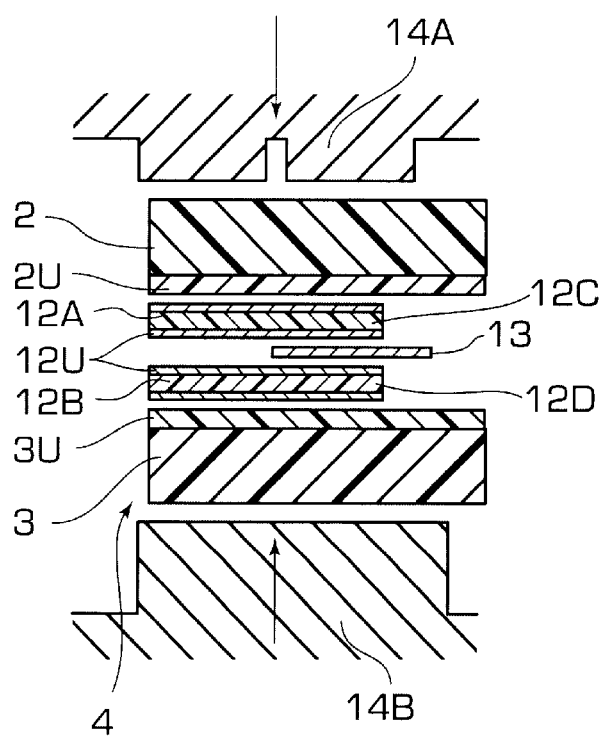
FIG. 3 is a partly enlarged section view illustrating a state of forming an outer peripheral joining region in a third embodiment of the air bag according to the invention.

FIG. 3 shows a third embodiment of the air bag according to the invention for the formation of the outer peripheral joining region.

In the third embodiment, each of the adhesion reinforcing layers 12A and 12B is laminated on both surfaces with thermoplastic resin films 12U such as urethane film or the like.

When the air bag 1 of the third embodiment is inflated by feeding a high pressure gas from the inflator 5 as in the first embodiment, even if the joint face will be peeled by the facing and backing sheets 2 and 3 separating from each other, peeling is prevented and also the separations between the facing sheet 2 and the thermoplastic resin film 2U and between the backing sheet 3 and the thermoplastic resin film 3U converting the peeling direction into the shearing direction are effectively prevented.

Figure 4A:
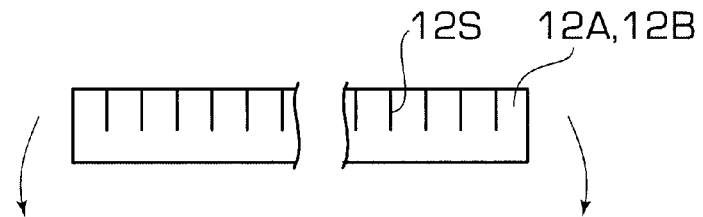
FIG. 4a is a side view of a tape-shaped body having slits formed on its surface at given intervals.
Figure 4B:
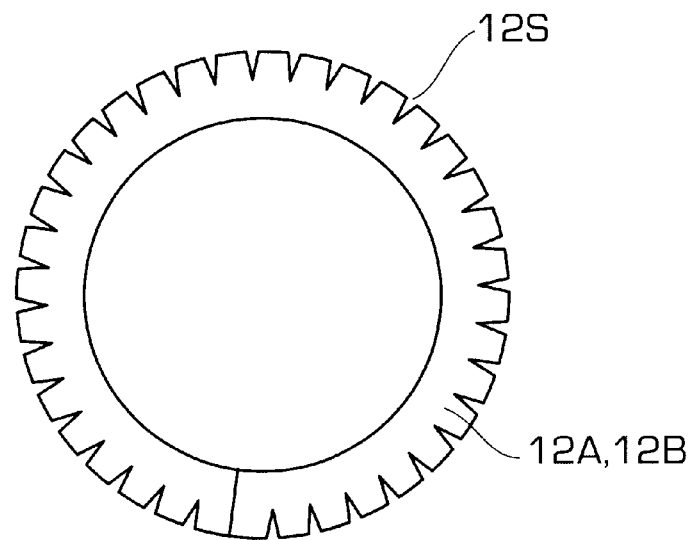
FIG. 4b is a front view of a ring-shaped body used as an adhesion reinforcing layer in a fourth embodiment of the air bag according to the invention.
Figure 4C:
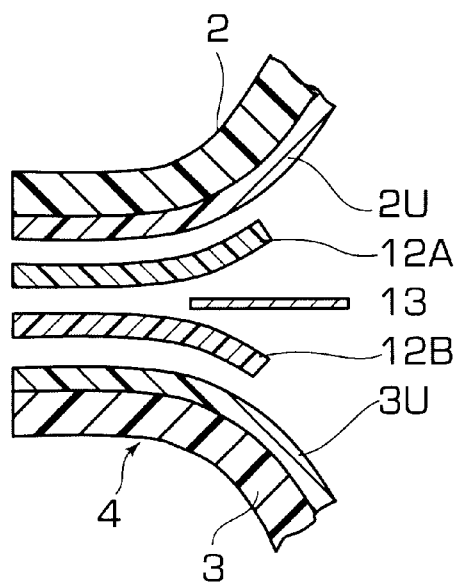
FIG. 4c is a partly enlarged and developed section view of an outer peripheral joining region in the fourth embodiment of the air bag.
Figure 8:
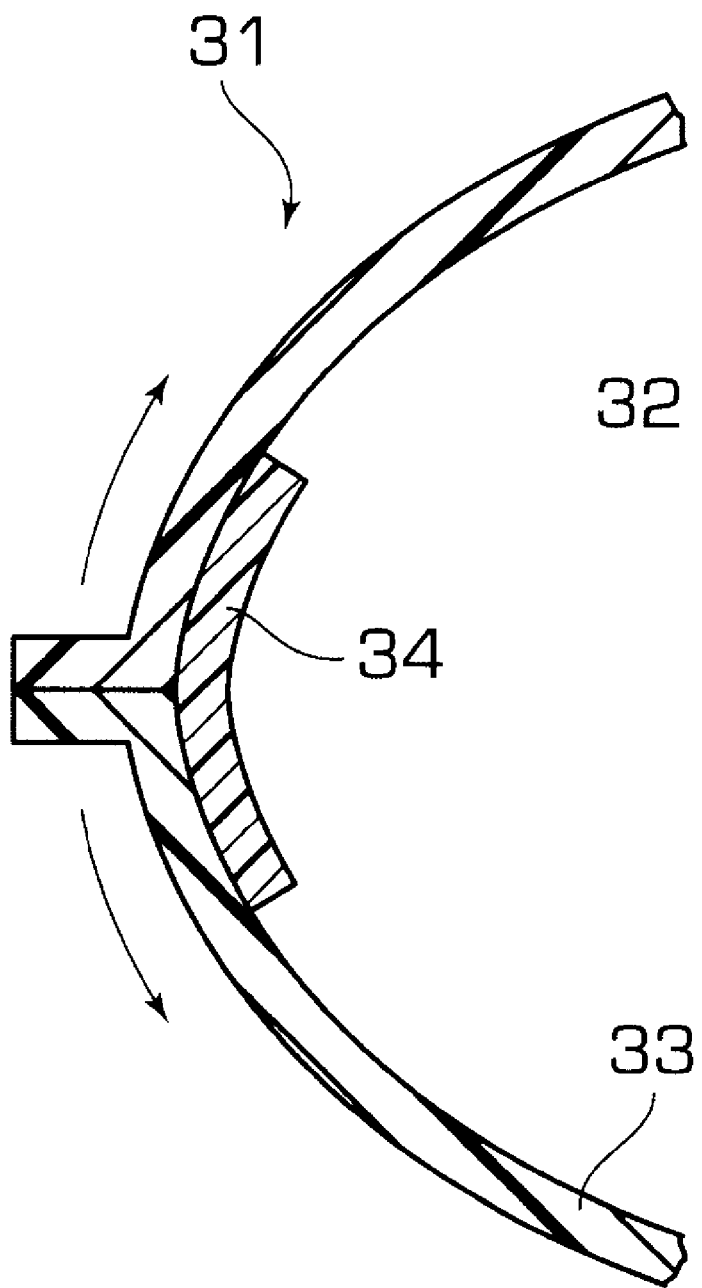
FIG. 8 is a partly enlarged section view of an outer peripheral joining region in a second embodiment of the conventional air bag.

FIG. 4 shows a fourth embodiment of the air bag according to the invention. A tape-shaped body 12A, 12B of a thermoplastic resin film such as urethane or the like having many slits 12S formed on its one-side surface at given intervals as shown in FIG. 4a is laminated on its one-side or both sides with a thermoplastic resin film such as urethane film or the like and then rendered into a circle approximately corresponding to the outer peripheral joining region of the air bag by joining both free ends of the tape-shaped body to each other as shown in FIG. 4b. Two resulting circular bodies 12A, 12B are used as adhesion reinforcing layers and placed between the facing sheet 2 and the backing sheet 3 constituting the air bag at a position corresponding to the outer peripheral joining region 4 of the air bag 1. The insulating layer 13 is inserted between the two circular bodies as shown in FIG. 4c, which are then joined together by heat-welding. The resulting air bag develops the same effect as in the first embodiment. Particularly, the adhesion reinforcing layer is easily obtained in flat and ring-shaped form, so that the production cost thereof becomes low.

FIG. 5 shows a fifth embodiment of the air bag according to the invention, in which the facing and backing sheets 2 and 3 are made from urethane resin film instead of the nylon film.

As shown in FIG. 5a, thermoplastic resin films 2U and 3U such as urethane or the like are laminated on at least outer peripheral joining regions of the facing and backing sheets 2 and 3 so as to face the films 2U and 3U with each other, which are placed between electrodes 14A and 14B arranged substantially in parallel to each other. Further, adhesion reinforcing layers 12A, 12B made from thermoplastic resin film such as urethane or the like having the same adhesion strength as the films 2U and 3U are set between the facing and backing sheets 2 and 3 at a position corresponding to the outer peripheral joining region 4. An insulating layer 13 is placed between the adhesion reinforcing layers 12A, 12B as a middle layer locally preventing the adhesion of the adhesion reinforcing layers 12A, 12B.

Then, the electrodes 14A and 14B are shifted in directions indicated by arrows to conduct heat-welding such as high frequency welding, whereby the facing and backing sheets 2 and 3 and the thermoplastic resin films 2U, 3U, 12A, 12B can strongly be joined at a position corresponding to the outer peripheral joining region 4 other than portions 4A and 4B of the adhesion reinforcing layers sandwiching the insulating layer 13 therebetween as shown in FIG. 5b.

When the air bag 1, provided with the heat-welded outer peripheral joining region 4, is inflated by feeding high pressure gas from the inflator 5, even if the joint face will be peeled by the facing and backing sheets 2 and 3 separating from each other, peeling is prevented by the strong welded adhesion reinforcing layers, 12A, 12B in the joint face, and also the portions 4A and 4B of the adhesion reinforcing layers sandwiching the insulating layer therebetween are strongly heat-welded onto the facing and backing sheets 2 and 3 to assist the prevention of above peeling phenomenon. Hence the separations between the facing sheet 2 and the thermoplastic resin film 2U and between the backing sheet 3 and the thermoplastic resin film 3U converting the peeling direction into the shearing direction are effectively prevented.

In this embodiment, all of the facing and backing sheets 2 and 3 and the thermoplastic resin films 2U, 3U and 12A, 12B laminated thereonto are made from the urethane resin film, so that the heat-weldability is very high and there is caused no peeling.

Moreover, the facing and backing sheets 2, 3 provided with the thermoplastic resin films 2U and 3U and the adhesion reinforcing layers 12A, 12B and the insulating layer 13 are merely laminated in layer form between the electrodes 14A and 14B arranged in parallel to each other, so that the outer peripheral portions of these members can easily be joined at once by the welding and hence the structure of the joining device itself becomes simple.

As the material for the facing and backing sheets, thermoplastic elastomers such as ester, amide and the like may be used in addition to urethane elastomer. Preferably, thermoplastic resin such as polyurethane, polyamide, polyester, polycarbonate, polyimide and so on are used.

FIG. 6 shows a sixth embodiment of the air bag according to the invention, which is a modification of the fifth embodiment.

As shown in FIG. 6a, the facing and backing sheets 2 and 3 and the adhesion reinforcing layers 12A, 12B, each being made from urethane resin film, are set between the electrodes 14A and 14B together with the insulating layer 13, which are heat-welded by approaching the electrodes in directions illustrated by the arrows.

As shown in FIG. 6b, the facing and backing sheets 2 and 3 and the adhesion reinforcing layers 12A, 12B are strongly joined at a position corresponding to the outer peripheral joining region 4 other than portions 4A and 4B of the adhesion reinforcing layers sandwiching the insulating layer 13 therebetween.

When the air bag 1 provided with the heat-welded outer peripheral joining region 4 is inflated by feeding a high pressure gas from the inflator 5, even if the joint face will be peeled by the facing and backing sheets 2 and 3 separating from each other, peeling is prevented by the strong welded adhesion reinforcing layers 12A, 12B in the joint face, and also the portions 4A and 4B of the adhesion reinforcing layers sandwiching the insulating layer therebetween are strongly heat-welded onto the facing and backing sheets 2 and 3 to assist the prevention of above peeling phenomenon. Further, the peel strength between the adhesion reinforcing layers 12A, 12B is increased.

Although the invention is described with reference to the above embodiments, the materials of the facing and backing sheets, the joining form thereof, material of the resin layer laminated thereon, laminating method, material of the insulating layer, material and form of the adhesion reinforcing layer, and reinforcement of the openings for inflator and ventilation may properly be varied within a scope of the invention.

As mentioned above, according to the invention, the facing and backing sheets laminated with thermoplastic resin film on at least a joint face corresponding to the outer peripheral joining region are heat-welded together with the adhesion reinforcing layer(s) previously set between the facing and backing sheets while interposing the insulating layer so as to locally prevent the adhesion of the adhesion reinforcing layer(s), so that the facing and backing sheets are strongly joined through the adhesion reinforcing layers by heat-welding. Therefore, even if the joint face will be peeled by the facing and backing sheets separating from each other through the inflation of the air bag, the peeling is prevented by the strong welded adhesion reinforcing layers in the joint face. Also the portions of the adhesion reinforcing layers sandwiching the insulating layer therebetween are strongly heat-welded onto the facing and backing sheets to assist the prevention of above peeling phenomenon. Hence the separations converting the peeling direction into the shearing direction between the facing sheet and the thermoplastic resin film laminated thereon and between the backing sheet and the thermoplastic resin film laminated thereon are effectively prevented.

Furthermore, when the thermoplastic resin film laminated on the facing and backing sheets is the same as the facing and backing sheets, the heat weldability is further increased and there is caused no peeling.

Also, the members constituting the air bag are merely set at a laminated state between electrodes for the heat welding such as high frequency welding, and hence the outer peripheral joining region can easily be formed at once by linearly moving the electrodes and the structure of the joining device itself becomes simple.

What is claimed is:

1. An air bag comprising: a facing sheet and a backing sheet each made from a thermoplastic resin film and laminated on at least a joining region thereof at outer peripheral portions with a thermoplastic resin film, at least one adhesion reinforcing layer interposed between the facing sheet and the backing sheet at the joining region and made from a thermoplastic resin, and an insulating layer interposed proximate the adhesion reinforcing layer at a region ranging from a position corresponding to an approximate center of the joining region toward the inside thereof, the facing and backing sheets and the adhesion reinforcing layer being heat-welded together at the joining region.

2. An air bag according to claim 1, wherein each of the facing sheet and backing sheet is made from an urethane film, and laminated over a full surface of said facing sheet and said backing sheet.

3. An air bag according to claim 1, wherein the adhesion reinforcing layer is made from an urethane resin film and laminated on opposite surfaces with a thermoplastic resin film.

4. An air bag according to claim 1, wherein the adhesion reinforcing layer is a ring of urethane resin having a shape corresponding to the joining region and provided on an inner peripheral face with a notch having a given depth.

5. An air bag according to claim 1, wherein the adhesion reinforcing layer is formed by joining free ends of a body having slits formed on a surface at given intervals to each other so as to have a ring shape corresponding to the outer peripheral joining region.

6. An air bag according to claim 1 further comprising a second adhesion reinforcing layer and said insulating layer is interposed between said adhesion reinforcing layer and said second adhesion reinforcing layer.

7. An air bag according to claim 1, wherein said adhesion reinforcing layer comprises a single layer split into two portions and said insulating layer is interposed between said split portions.

* * * * *

UNITED STATES PATENT AND TRADEMARK OFFICE
CERTIFICATE OF CORRRECTION

PATENT NO. : 5,909,895
DATED : June 8, 1999
INVENTOR(S) : Yasuhiro Iino, et al.

It is certified that error appears in the above-identified patent and that said Letters Patent is hereby corrected as shown below:

On the title page item [56], insert

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 5 | 2 | 4 | 9 | 2 | 6 | 06/11/96 | Hirai, et al. | | | |
| | | | | | | | | | | | | | |

FOREIGN PATENT OR PUBLISHED FOREIGN PATENT APPLICATION

| | | DOCUMENT NUMBER | | | | | PUBLICATION DATE | COUNTRY OR PATENT OFFICE | CLASS | SUBCLASS | TRANSLATION | |
|---|---|---|---|---|---|---|---|---|---|---|---|---|
| | | | | | | | | | | | YES | NO |
| | | DE | 195 | 13 | 297 | A1 | | 11/09/95 | Germany | | | | |

OTHER DOCUMENTS (Including Author, Title, Date, Pertinent Pages, Etc.)

"PATENT ABSTRACTS OF JAPAN", M-1057 December 11, 1990, Vol. 14/No. 556, JP2-237837, September 20, 1990

Signed and Sealed this

Ninth Day of November, 1999

Attest:

Q. TODD DICKINSON

*Attesting Officer*    *Acting Commissioner of Patents and Trademarks*